United States Patent

Togami

[15] 3,638,407
[45] Feb. 1, 1972

[54] PLATFORM KNIFE-CUTTING ANGLE ADJUSTMENT

[72] Inventor: Paul G. Togami, East Moline, Ill.
[73] Assignee: International Company, Chicago, Ill.
[22] Filed: Dec. 12, 1969
[21] Appl. No.: 884,427

[52] U.S. Cl. ............................56/15.6, 56/208, 56/DIG. 9
[51] Int. Cl. .....................................................A01d 41/02
[58] Field of Search..............................56/15.6, 208, DIG. 9

[56] References Cited

UNITED STATES PATENTS

| | | | |
|---|---|---|---|
| 3,474,606 | 10/1969 | Oehler et al. | 56/208 |
| 2,170,573 | 8/1939 | Pierson | 56/208 |
| 3,431,711 | 3/1969 | Claas | 56/15.6 |
| Re. 36,512 | 12/1968 | Rohweder | 56/15.6 |

*Primary Examiner*—Russell R. Kinsey
*Assistant Examiner*—J. A. Oliff
*Attorney*—Floyd B. Harman

[57] ABSTRACT

A quick detachable apparatus for connecting a harvesting platform to its feeder housing at various angles thereto. The location of the upper coupling element carried by the feeder housing is adjustable about an underlying axis and the arcuate abutting surfaces of the lower coupling are generated about this same axis. Thus regardless of the location of the upper coupler, the abutting surfaces of the lower coupler are always aligned.

7 Claims, 3 Drawing Figures

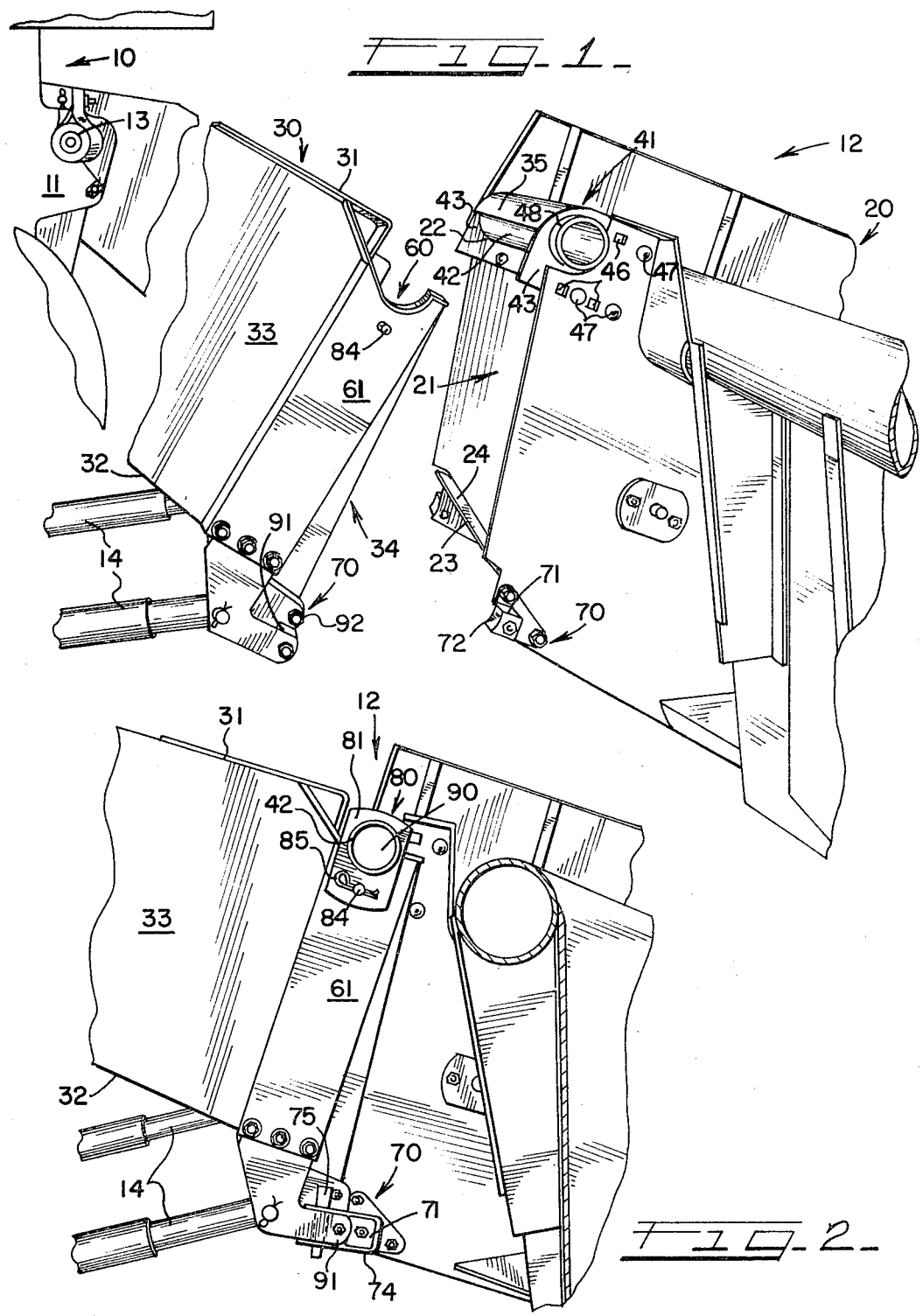

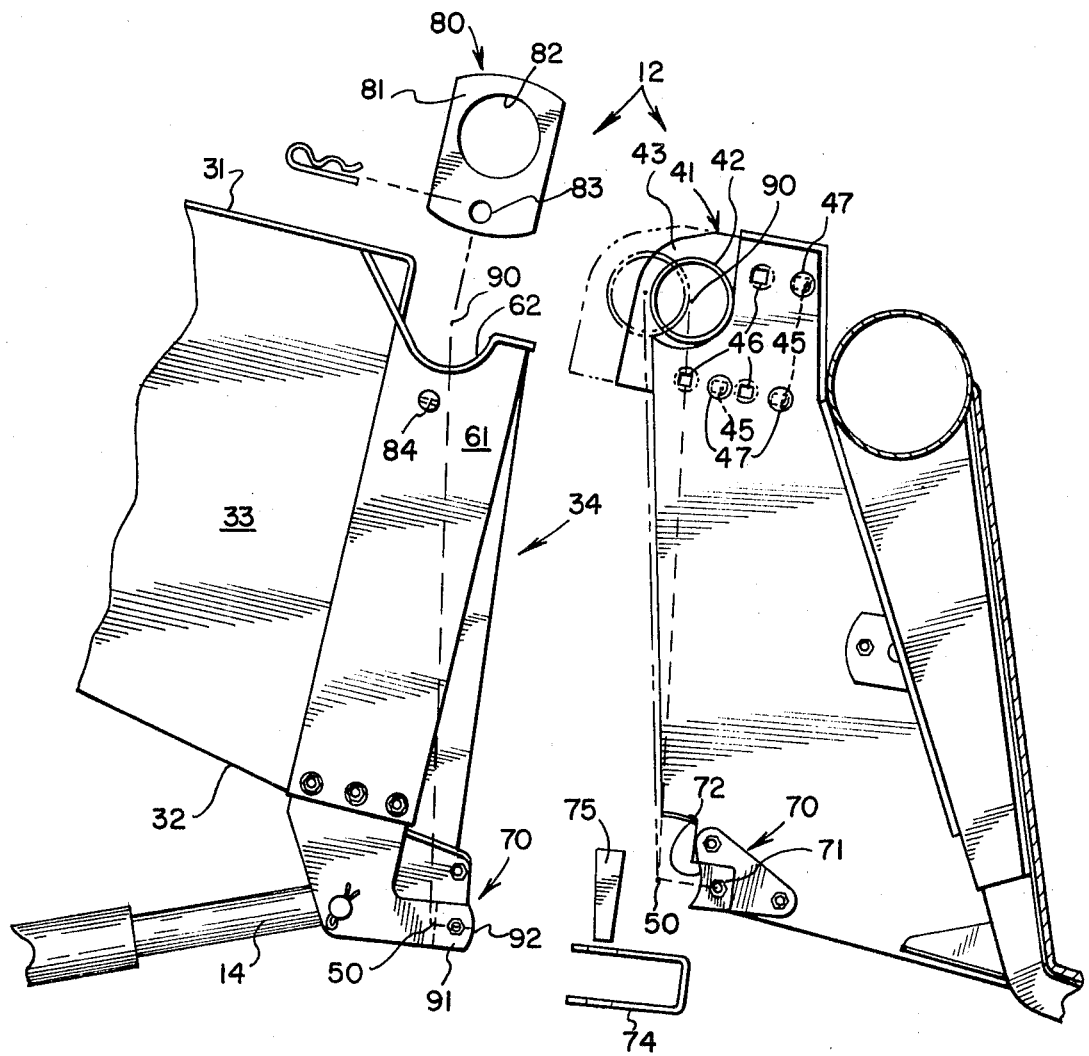

PLATFORM KNIFE-CUTTING ANGLE ADJUSTMENT

BACKGROUND OF THE INVENTION

1. Field of the Invention

The present invention relates generally to improvements in agricultural harvesting machines and the like and more particularly to a new and improved quick detachable connection between the harvesting platform and its feeder housing.

2. Description of the Prior Art

The prior art discloses quick detachable connections between the free end of the feeder housing and the harvesting platform of the general type disclosed herein. Reference may be made to the following patents for a disclosure of the prior art: Allen U.S. Pat. No. 2,867,958 of Jan. 13, 1959; Rohweder Reissue U.S. Pat. No. 26,512 of Dec. 31, 1968; Ashton et al., U.S. Pat. No. 3,324,637 of June 13, 1967; Teale U.S. Pat. No. 3,412,534 of Nov. 26, 1968; and Claas U.S. Pat. No. 3,431,711 of Mar. 11, 1969. In the prior art all of the various coupling devices connect the platform to the feeder housing at a fixed angle thereto. The cutter bar is fixed to the platform and thus, in all of the prior art devices, the angle of the cutter bar, relative to the ground at a particular elevation over the ground, is fixed. Under normal working conditions the cutter bar lies at an elevated attitude with respect to the ground line. This, of course, causes the crops to be severed at a point above the ground line, however, it has the advantage that the cutter bar will not attempt to burrow into the soil when a high point is encountered. In some crops, such as soybeans, where the grain is very close to the ground line, it is desirable to adjust the attitude of the cutter bar downwardly so that the crops can be severed closer to the ground line. In adjusting the attitude of the cutter bar downwardly, the likelihood of the cutter bar burrowing into the ground is, of course, increased, however, for some crops such as soybeans, the additional crop yield outweighs this disadvantage. Through the subject invention the combine operator can change the normal inclined attitude of the cutter bar to a declining attitude by merely adjusting one of the upper coupling elements. There are no additional parts or elements that must be added and the normal grain seals function as well in the adjusted position as they do in the normal position.

SUMMARY

The general purpose of this invention is to provide a quick-coupling mechanism between the harvester platform and its feeder housing which embraces all the advantages of similarly employed prior art devices and possesses none of the aforedescribed disadvantages. To attain this, the present invention contemplates a unique coupling arrangement that will permit adjustment of the platform relative to the feeder and thereby adjust the angle of the cutter bar relative to the ground line. The platform and feeder housing are connected adjacent the top and the bottom walls of the feeder housing and in this respect, there is an upper coupling element and a lower coupling element on both the platform and the feeder housing. Through the subject invention, only one of the upper coupling elements must be adjusted in order to accomplish the desired result. This is accomplished by moving the upper coupling element about an underlying pivot axis and providing both lower coupling elements with arcuate abutting surfaces generated about this same pivot axis. The sealing means for preventing grain loss at the coupling is arranged to be deflected upon coupling and has sufficient resiliency to function properly within the range of adjustment. This invention includes simple locking means that can be applied and released without the aid of special tools. The object of the invention is to provide a quick detachable coupling between a harvester platform and the feeder housing that will permit adjustment of the angularity therebetween.

These, and other objects of the invention will become more apparent from the specification and drawing wherein:

BRIEF DESCRIPTION OF THE DRAWING

FIG. 1 shows a side view of the uncoupled platform and feeder housing and a portion of the crop-processing unit;
FIG. 2 is a lay-out view from the side of the coupling; and
FIG. 3 is a lay-out view from the side showing the platform uncoupled from the feeder housing.

DESCRIPTION OF THE PREFERRED EMBODIMENT

Referring now to the drawings wherein like reference characters designate like or corresponding parts throughout the several views there is shown in FIG. 1 an agricultural machine designated 10 including a crop-processing unit 11 having a crop-gathering unit 12 connected thereto by pivot means 13. The crop-gathering unit 12 is made up of a transverse platform 20 and a longitudinal feeder housing 30. The crop to be harvested is collected on the transverse platform 20 and fed upwardly and rearwardly through the longitudinal feeder housing 30 into the crop-processing unit 11. A pair of hydraulic cylinders 14 extend between the crop-processing unit 11 and the longitudinal feeder housing 30 and function to pivot the latter about the pivot connecting means 13. The hydraulic cylinders 14 thus provide the means by which the operator can adjust the distance of the platform 20 and thus the cutter bar carried thereby above the ground line. As shall be further discussed the hydraulic cylinders 14 also provide the means through which the combine operator connects and disconnects the transverse platform 20 from the longitudinal feeder housing 30.

As can be seen in FIG. 1, the transverse platform 20 has a centrally located crop transfer opening 21 defined by an upper edge 22 and a lower edge 23. There is a sealing means 24 carried along the lower edge 23 of the crop transfer opening. A seal means 35 extends transversely across the upper edge 22 of the crop transfer opening. It should be noted that although the crop transfer opening 21 is disclosed centrally of the platform 20 it could also be offset to one side or the other.

The longitudinal feeder housing 30 is in the form of a conduit having an upper wall 31, a lower wall 32 and connecting sidewalls 33. The forward end of the longitudinal feeder housing 30 defines a crop inlet opening 34 that is dimensioned to correspond to the crop transfer opening 21 of the platform 20.

A quick-detachable means is provided for connecting the transverse platform 20 to the longitudinal feeder housing 30 such that the crop transfer opening 21 is aligned with the crop inlet opening 34. The quick-detachable means connects the upper portion of the platform 20 to the upper portion of the longitudinal feeder housing 30 and the lower portion of the platform 20 to the lower portion of the longitudinal feeder housing 30. There is a coupling element on each side at the top and at the bottom and in this respect there are actually four sets of cooperating coupling elements. However, for the purpose of this description, the two top coupling elements shall be referred to as a single coupling element and likewise the two bottom coupling elements shall be referred to as a single coupling element. The quick-detachable means include a first structure coupling element 41 on the upper portion of the transverse platform 20. The first structure 41 includes a transversely extending tube 42 with a pair of radially extending mounting plates 43 secured thereto. The mounting plates 43 are secured to the tube 42 such that a pair of transversely protruding free ends 48 having arcuate under surfaces extend outwardly of the mounting plate 43. The first structure 41 is connected to the transverse platform 20 by adjustable means. The transverse platform 20 has a set of front holes designated 45 and a set of rear holes designated 46. Each of the mounting plates 43 have a set of holes formed therein that can be aligned with either the front or rear holes 45, 46. The first structure 41 can thus be secured by nuts and bolts 47 to the transverse platform 20 at the set of front holes 45 or at the set of rear holes 46. As can be best seen in FIG. 3 the sets of holes 45 and 46 are located relative to each other such that first structure 41 is adjustable with respect to platform 20 about an underlying pivot axis designated 50. In other words, the corresponding holes of the sets 45 and 46 can be connected by an arc generated about the pivot axis 50. It should be understood that although the adjustable means disclosed herein includes only the two extreme positions additional steps in the adjustment is contemplated.

The quick detachable means further includes a second structure or coupling element 60 carried by the upper portion of the longitudinal feeder housing 30. The second structure 60 includes a pair of forwardly protruding elements 61 having upwardly opening arcuate cradles 62 formed therein. The upwardly opening arcuate cradles 62 are located and dimensioned to receive the transversely protruding free ends 48 and permit pivotable movement therebetween about a horizontal transverse axis 90.

The quick detachable means include fastening means designated 70 adjacent the lower portions of the transverse platform 20 and longitudinal feeder housing 30. The fastening means 70 include a first pair of transversely protruding abutments 71 carried by the lower portion of the transverse platform 20 having abutting arcuate surfaces 72 formed thereon. The abutting arcuate surfaces 72 are generated about the pivot axis 50 for a purpose that shall be further discussed. (See FIG. 3) The fastening means 70 further includes a pair of transversely protruding abutments 91 carried by the lower portion of the longitudinal feeder housing 30. The protruding abutments 91 have abutting arcuate surfaces 92 having a radius equal to the radius of the abutting arcuate surfaces 72.

As can be seen in FIGS. 2 and 3, clamp means including a channel 74 encompass the protruding elements 71 and 91 and is locked in place by a wedge 75.

As can be seen in FIGS. 2 and 3, retaining means are provided for securing the transversely protruding free ends 48 in seated engagement with the upwardly opening arcuate cradles 62. The retaining means 80 include plates 81 having apertures 82 formed therein adapted to closely receive the protruding free ends 48 and means for attaching plate 81 to the forwardly protruding elements 61. The means for attaching plates 81 includes rods 84 extending transversely from the forwardly protruding elements 61 and corresponding apertures 83 formed in plates 81 and locking pins 85 to hold the plates 81 in place.

It is believed that a discussion of the procedure required to change the platform from its normal attitude (cutter bar inclined) to the close cutting attitude (cutter bar declined) will suffice to clarify the overall operation of the device. The transverse platform 20 must first be disconnected from the longitudinal feeder housing 30 and this is accomplished by pulling the locking pins 85 to thus release the retaining means. The wedges 75 are knocked out and the channels 74 removed to thus release the fastening means 70. The hydraulic cylinders 14 are then actuated to lower the longitudinal feeder housing 30. As the bottom of the transverse platform 20 engages the ground, the abutting arcuate surfaces 72 and 92 will move away from each other until the transverse platform 20 is fully supported on the ground. Upon further lowering of the longitudinal feeder housing 30, the upwardly opening arcuate cradles 62 are completely free of the transversely protruding free ends 48 and the agricultural machine 10 including the longitudinal feeder housing 30 can be backed away from the transverse platform 20. For normal cutting the bolts 47 are in the front set of holes 45 and to adjust the platform for close cutting these bolts are removed and inserted through the rear set of holes 46. After the first structure 41 has been adjusted by changing the bolts 47 from the front set of holes 45 to the rear set of holes 46 the agricultural machine 10 is driven forward to a position where the upwardly opening arcuate cradle 62 underlie the transversely protruding free ends 48. The hydraulic cylinders 14 are then actuated to elevate the longitudinal feeder housing 30. This will cause the abutting arcuate surfaces 72 and 92 to pivot into engagement. After the abutting arcuate surfaces 72 and 92 are engaged the fastening means 70 are applied by placing the channel 74 over the protruding abutments 71 and 91 and inserting the wedge 75. The retaining means are then applied by placing the plates 81 over the transversely protruding free ends 48 and rods 84 and inserting the locking pins 85. The machine is then ready to harvest a crop such as soybeans where it is necessary to sever the crop close to the ground line. It should be understood that in order to change the platform back to the normal attitude, the same procedure is followed and the bolts 47 are changed from the set of rear holes 46 to the set of front holes 45.

It should be understood, of course, that the foregoing disclosure relates to only a preferred embodiment of the invention and that numerous modifications or alterations may be made therein.

What is claimed is:

1. In an agricultural machine including a crop-processing unit and a crop-gathering unit;

said crop-gathering unit including a transverse platform and a longitudinal feeder housing each having an upper and a lower portion, means pivotally connecting one end of said feeder housing to said crop-processing unit, quick detachable means for connecting the other end of said feeder housing to said transverse platform, and means between said crop-processing unit and said feeder housing for pivoting the latter about said pivotally connecting means;

said quick-detachable means comprising a first structure adjustably secured to the upper portion of said transverse platform, said first structure including a pair of transversely protruding free ends having arcuate undersurfaces, said quick detachable means further including a second structure carried by the upper portion of the feeder housing, said second structure including a pair of forwardly protruding elements each having upwardly opening arcuate cradles formed therein, said pair of transversely protruding free ends seating in said upwardly opening arcuate cradles upon upward movement of said feeder housing and permitting pivotable movement therebetween about a horizontal transverse axis, and fastening means carried by the lower portions of the housing and platform for locking said platform to said feeder housing.

2. The invention as set forth in claim 1 wherein the adjustable securement of said first structure to the upper portion of the transverse platform is limited to an arc generated about a pivot axis adjacent said lower portions, and wherein said fastening means include abutting arcuate surfaces generated about said pivot axis.

3. The invention as set forth in claim 2 wherein said fastening means include a pair of transversely protruding abutments, said abutting arcuate surfaces being formed on said transversely protruding abutments, and clamp means encompassing said transversely protruding abutments and operative to retain said abutting arcuate surfaces in engagement.

4. The invention as set forth in claim 1 wherein retaining means are provided for preventing the unseating of said pair of transversely protruding free ends from said upwardly opening arcuate cradle.

5. The invention as set forth in claim 4 wherein said retaining means include a plate having an aperture formed therein of a configuration to receive one of said free ends and means for attaching said plate to one of said forwardly protruding elements.

6. The invention as set forth in claim 2 wherein retaining means are provided for preventing the unseating of said pair of transversely protruding free ends from said upwardly opening arcuate cradles.

7. The invention as set forth in claim 6 wherein said fastening means include a pair of transversely protruding abutments, said abutting arcuate surfaces being formed on said transversely protruding abutments, and clamp means encompassing said transversely protruding abutments and operative to retain said abutting arcuate surfaces in engagement.

* * * * *